Oct. 16, 1934.  E. W. REYNOLDS  1,977,354
PHOTOACOUSTIC CINEMATOGRAPHIC APPARATUS
Filed March 17, 1930    5 Sheets-Sheet 1
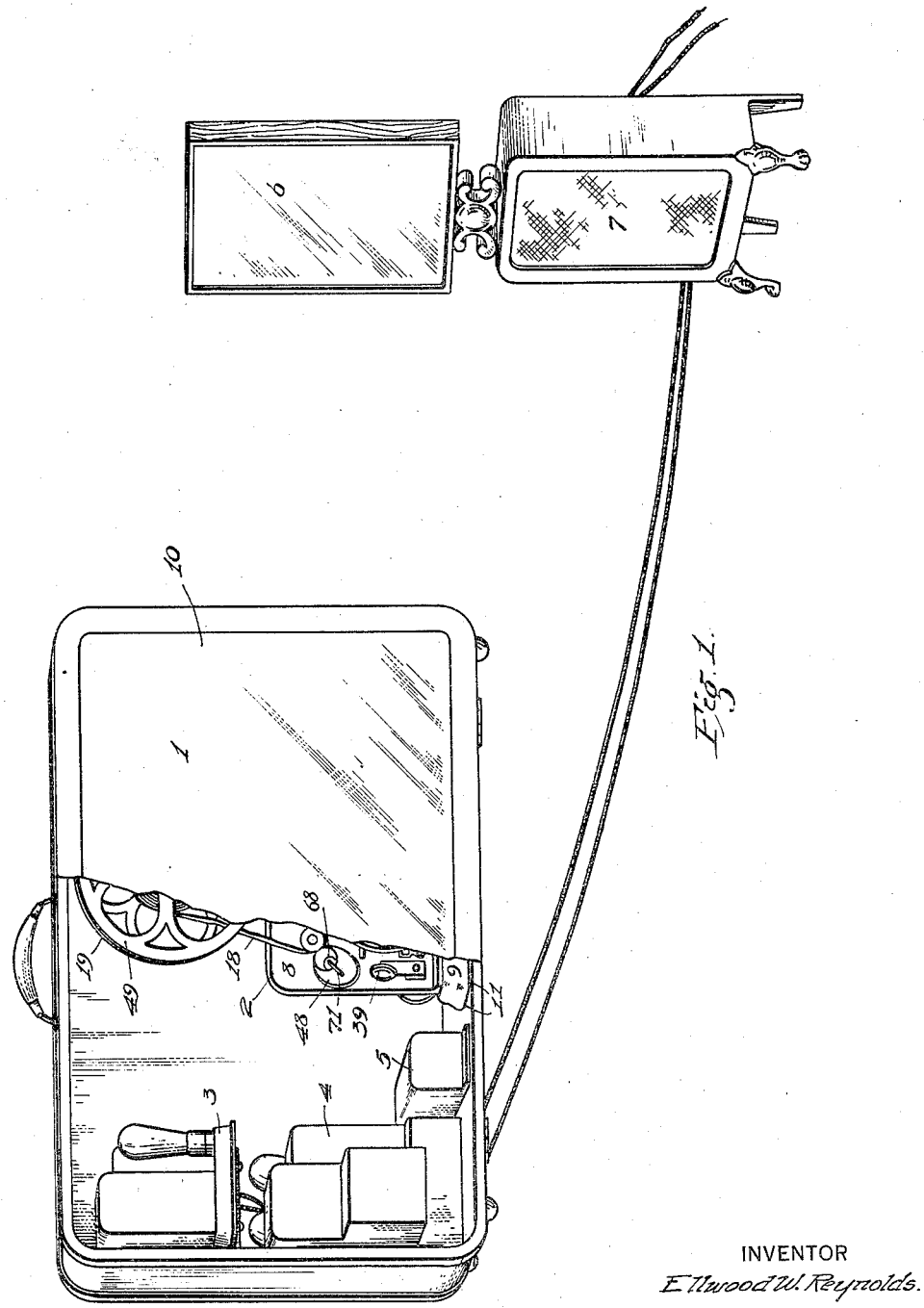
INVENTOR
Ellwood W. Reynolds.
BY
ATTORNEY

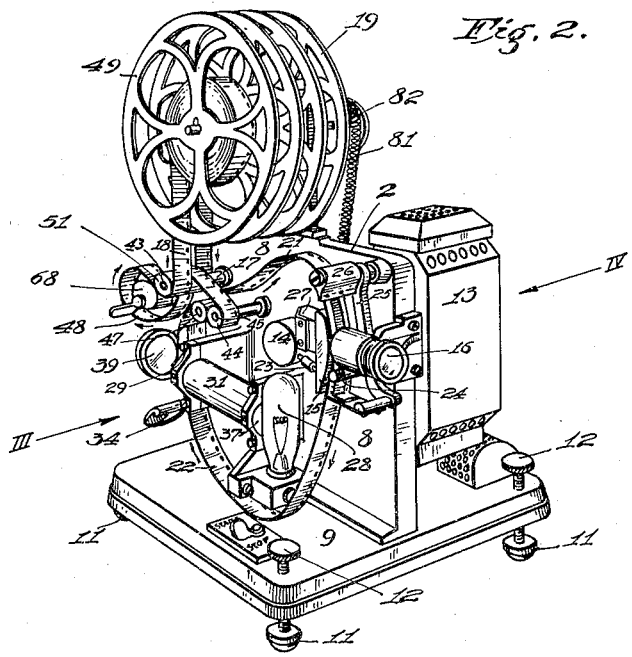
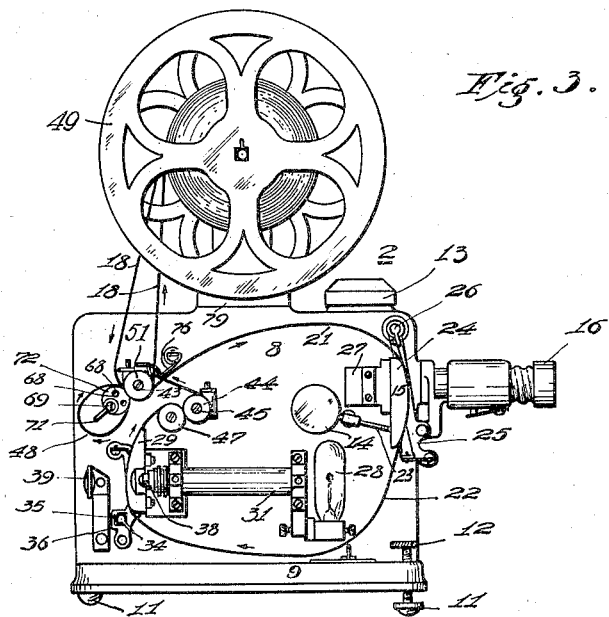

Oct. 16, 1934.  E. W. REYNOLDS  1,977,354
PHOTOACOUSTIC CINEMATOGRAPHIC APPARATUS
Filed March 17, 1930   5 Sheets-Sheet 3
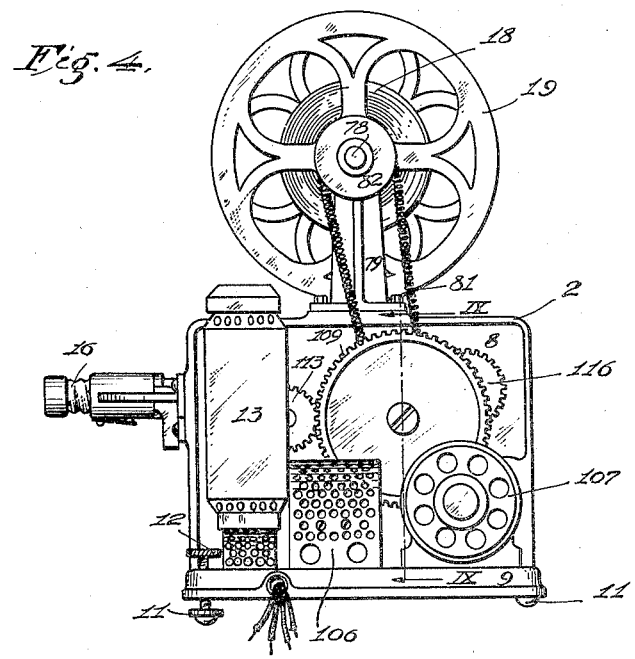
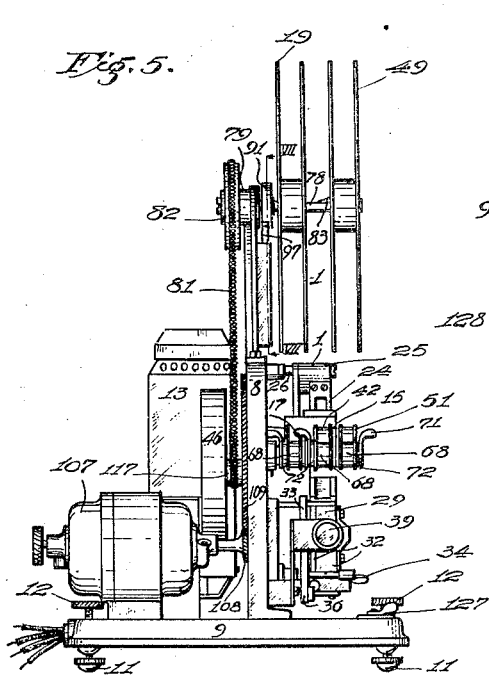
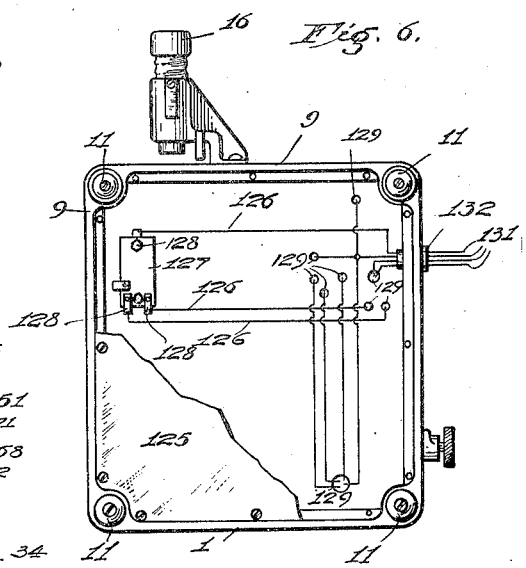
INVENTOR
Ellwood W. Reynolds.
BY
ATTORNEY

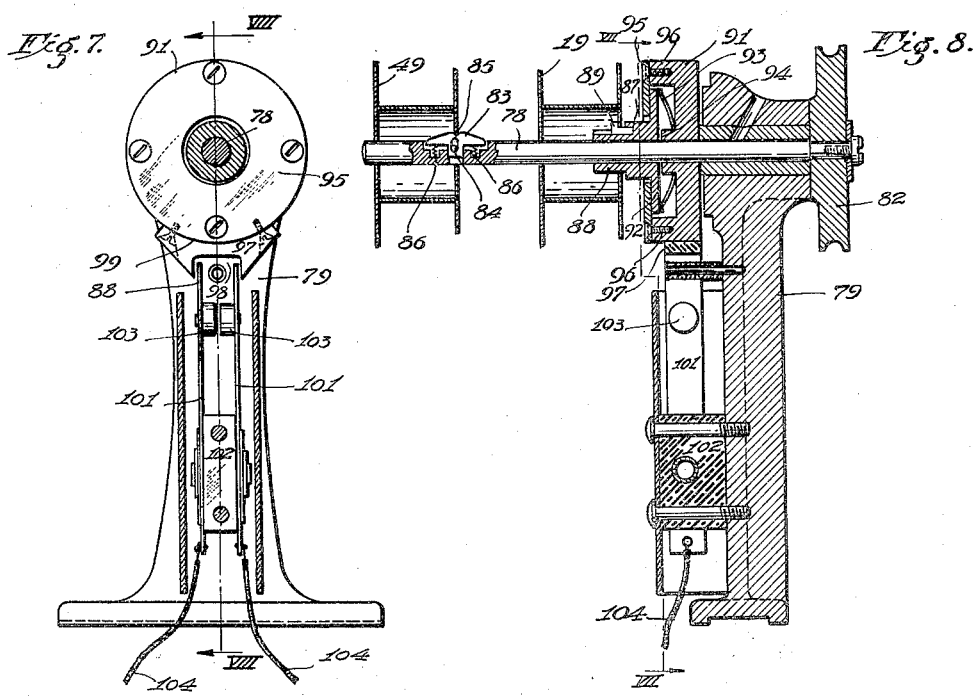
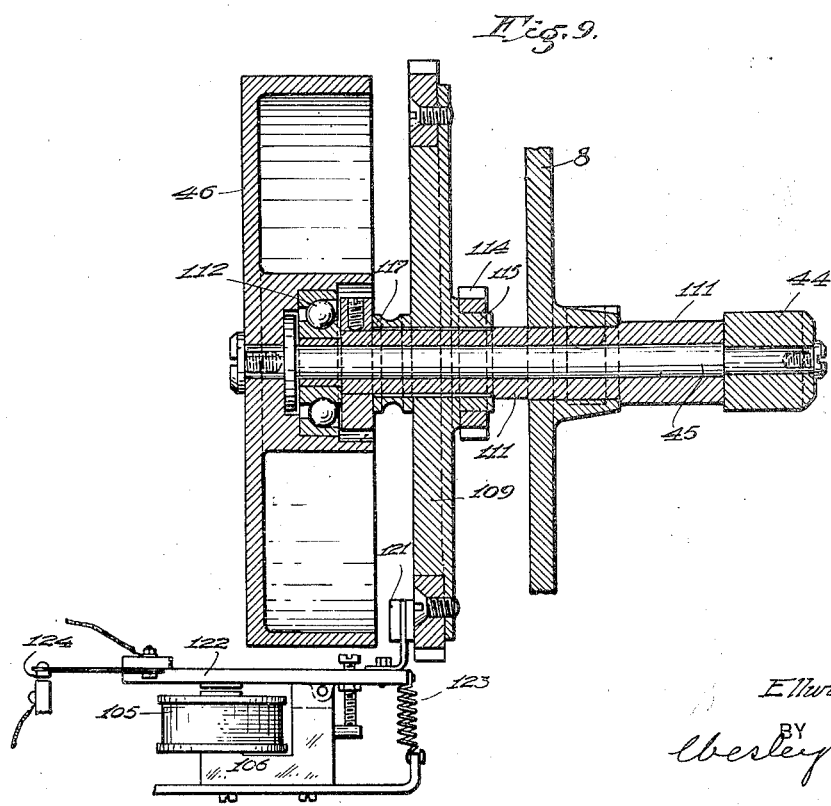

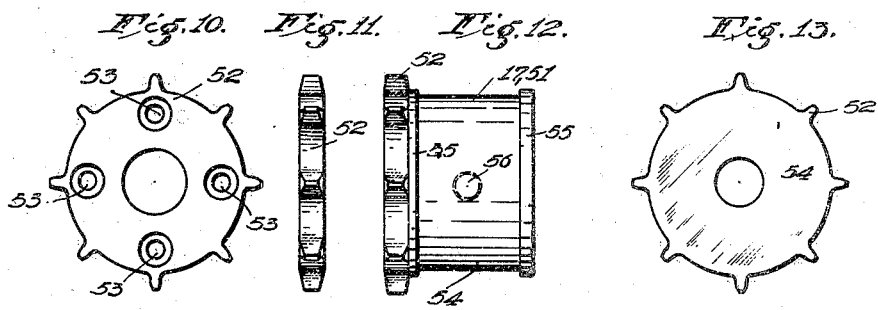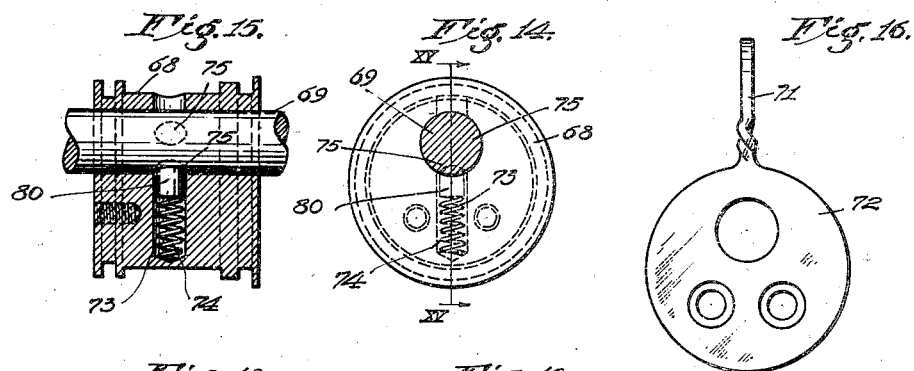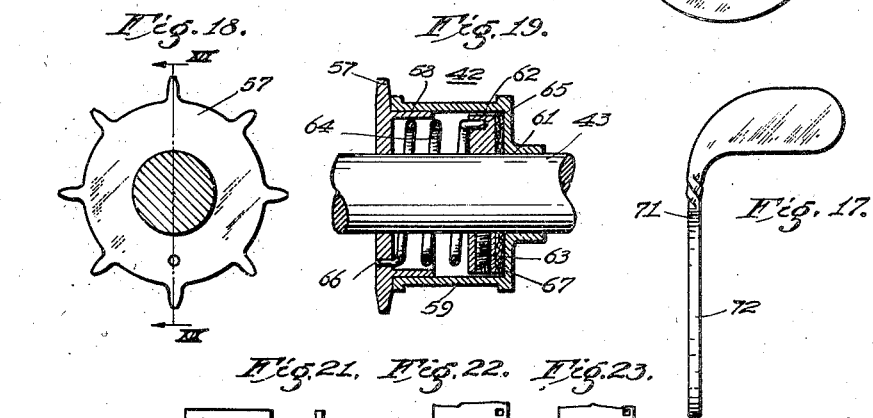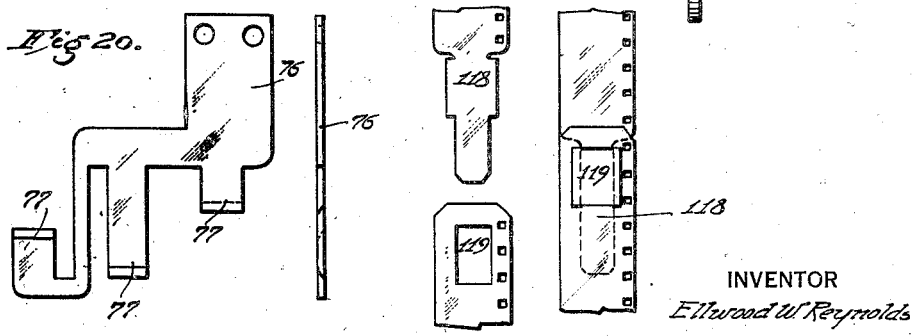

Patented Oct. 16, 1934

1,977,354

UNITED STATES PATENT OFFICE

1,977,354

PHOTOACOUSTIC CINEMATOGRAPHIC APPARATUS

Ellwood W. Reynolds, Drexel Hill, Pa., assignor to Westinghouse Electric & Manufacturing Company, a corporation of Pennsylvania Application March 17, 1930, Serial No. 436,552

8 Claims. (Cl. 271—2.3)

My invention relates to photo-acoustic cinematographic apparatus and it has particular relation to domestic equipment of this type.

The conditions and requirements imposed on acoustic-cinematographic equipment intended for home use are by far more numerous and stringent than those imposed on theatre apparatus.

A theatre machine is ordinarily installed as a permanent fixture in a booth and is handled only by experienced operators. A domestic machine, on the other hand, to have universal popularity, and hence, to be commercially successful, must have universal adaptability. It must, consequently, be small and portable and must lend itself to operation by an unskilled person.

Moreover, the owner of a domestic machine has the opportunity of scrutinizing the entertainment produced by such machine more continually, and, consequently, more critically, than he observes the offering of a theatre machine. As a result, domestic acoustic-cinematographic equipment must be capable of delivering better quality than the theatre equipment.

Another consideration that further accentuates the rigorous requirement of quality arises from the fact that a considerable rental must of necessity be levied on the owner of a domestic machine for the use of the film. The expense of the film also adds the condition that the machine shall have no deleterious effect upon it.

In acoustic-cinematographic equipment made according to the teachings of the prior art with which I am familiar, the sound is disposed in the form of a spiral groove on a wax record that is rotated in synchronism with the projection machine. The numerous difficulties involved in the manufacture and operation of a composite machine of this type are obvious.

By reason of the limitations present in the structure of the material involved in the production of a wax record, the maximum period of continuous performance that can be obtained with a disc machine is ten minutes. However, a ten minute performance requires a sixteen-inch disc and, consequently, renders the machine rather cumbersome.

Insignificant though it may seem, the matter of positioning the needle on the disc in such manner that the sound is tolerably synchronous with the picture, requires certain perseverance and has proved an insurmountable difficulty to many an amateur operator.

Finally, the care of the film used in the disc cinematographic machine demands the skill and diligence with which only experienced operators are equipped. Hence, the permanent ownership of favorite films and their corresponding records, a highly desirable institution from the standpoint of both the amateur and the picture producer, is not feasible.

It is, accordingly, an object of my invention to provide domestic acoustic-cinematographic apparatus wherein the permanent sound record is disposed as a photographic strip, on the film, contiguous to the picture.

Another object of my invention is to provide a portable photo-acoustic-cinematographic machine particularly adapted for home use.

A still further object of my invention is to provide domestic photo-acoustic-cinematographic equipment capable of delivering entertainment of exceptionally good quality.

More specifically stated, it is an object of my invention to provide photo-acoustic-cinematographic apparatus that shall be simple and light in its structure, comprise a minimum number of parts and be adapted to inexpensive manufacture in large quantities.

According to my invention, I provide a cinematographic machine, with acoustic attachment, wherein certain rotating parts are coaxial and the film is skewed in accordance with the location of these parts, advantage thus being taken of the total volume bounding the machine.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawings, in which Figure 1 is a view, in perspective, of the equipment comprising my invention as it appears during operation;

Fig. 2 is a view, in perspective, of an acoustic-cinematographic machine constructed according to my invention;

Fig. 3 is a view, in side elevation, of the machine, taken in the direction III of Fig. 2;

Fig. 4 is a view, in side elevation, of the machine taken in the direction IV of Fig. 2;

Fig. 5 is a view, in rear elevation, of the machine;

Fig. 6 is a view, in elevation, of the bottom of the machine, the cover being partly broken away;

Fig. 7 is a view, in section, taken along lines

VII—VII of Fig. 8 and showing the automatic stopping device included in the machine;

Fig. 8 is a view in section taken along line VIII—VIII of Fig. 7 and showing, in addition, the spindle and the reels positioned therein.

Fig. 9 is a view, in section, taken along the line IX—IX of Fig. 4;

Fig. 10 is a view, in front elevation, of a sprocket disc included in the insulating sprockets of the machine;

Fig. 11 is a view, in side elevation, of the sprocket disc;

Fig. 12 is a view, in side elevation, of an insulating sprocket;

Fig. 13 is a view, in front elevation, of the insulating sprocket;

Fig. 14 is a view, in front elevation, of a film-retaining stud;

Fig. 15 is a sectional view taken along line XV—XV of Fig. 14;

Fig. 16 is a view, in front elevation, of a lever whereby the stud is manipulated;

Fig. 17 is a view, in side elevation, of the lever;

Fig. 18 is a view, in front elevation, of a sprocket that advances the film through the sound gate;

Fig. 19 is a view, in section, taken along the line XIX—XIX of Fig. 18;

Fig. 20 is a view, in front elevation, of the film stripper;

Fig. 21 is a view, in side elevation, of the film stripper;

Fig. 22 is a view, in front elevation, of the ends of a film roll used in connection with my machine, and Fig. 23 is a view, in front elevation, showing the film ends in engagement.

The apparatus shown in Fig. 1 comprises a carrying case 1 wherein a photo-acoustic-cinematographic projector 2, together with a power-supply unit 3, an amplifier 4 and a transformer 5, capable of delivering the voltage necessary for a sound-exciting lamp, are disposed. An opening is provided in the carrying case 1 through which an image of the picture contained on the film is projected on a screen 6. The latter, together with a loudspeaker 7, constitute a separate unit. To facilitate threading of the film, the carrying case is provided with a side door 10, hinged along its lower edge and swingable, under the influence of gravity, to an open position.

The photo-acoustic-cinematographic projector 1 is provided with a cast upright plate 8, whereon the necessary accessories of a projector are disposed, as will be hereinafter described. The upright plate is fastened to a base plate 9 equipped with a plurality of supporting studs 11, certain of which are provided with adjusting screws 12 that facilitate the vertical positioning of the picture on the screen.

The picture-projection system is described in detail in a copending application of Mr. C. R. Hanna, Serial No. 441,583, filed Apr. 4, 1930, and assigned to the Westinghouse Electric and Manufacturing Company. For the present purpose, it is sufficient to say that it comprises principally a projection-light source 13 supported on the rear side of the upright plate 8, and an intermittent movement 14, a gate 15 and a projection lens-housing 16 supported on the front side of the plate 8.

A feed sprocket 17 delivers a film strip 18 from the feeding reel 19 to a loop reservoir 21, from which it is intermittently advanced through the gate 15 into a second loop reservoir 22 by a plurality of claws rigidly supported on a rod 23 that is intermittently actuated, as specifically described in the aforementioned application of C. R. Hanna.

The film gate 15, of a type specifically described in a copending application of W. A. Schultz, Serial No. 420,123, filed January 11, 1930 and assigned to the Westinghouse Electric and Manufacturing Company, is equipped with a plurality of tensioned shoe straps 24 supported on a bracket 25 pivotally mounted on a stud 26 fastened in the plate 8. The straps 24 exert a resilient pressure on the margins of the film 18 and cause it to present, at the picture aperture, a uniform surface that is invariable in its position along the optic axis of the condensing and projection system. The film is illuminated at the aperture by the light from the source 13 which is projected through an opening in the vertical plate and is reflected to the aperture by a vertical mirror 27, the reflecting plane of which is at an angle of 45° to the optic axis.

The sound-exciting system comprises an exciting lamp 28, an optical system and a sound gate 29, all supported on the front side of the upright plate 8.

The film 18 passes under the sound lamp 28 and the telescopic tube 31 of the optical system and is resiliently positioned in the gate 29 by a plurality of tensioned shoe-straps 32, similar in design to those of the picture gate. The straps 32 are supported on a bracket 33 that is pivotally movable relative to the aperture plate of the sound gate 29 by the coaction of a manually operated bell crank lever 34, an eccentric cam 35 and a square cam follower 36.

The telescope tube 31 of the optical system contains a condenser 37, a horizontal slit (not shown) illuminated by the condensed light from the horizontal filament of the exciting lamp and a microscope objective 38 that casts a reduced image of the slit on the film 18. In addition to the telescope tube and its appurtenances, the optical system includes a simple lens 39, the function of which is to reduce the cross section of the light beam that impinges on the photocell cathode.

As is well known to those skilled in the talking-motion-picture art, comparatively small irregularities in the speed of a photo-acoustic film, as it passes through the sound gate, appear as distortions in the sound that tend to give it rather disagreeable characteristics. On the other hand, by reason of the non-uniformity in the shrinkage property of the film, the sprocket-hole pitch varies over a considerable range for various films, and, consequently, since it is not possible to design a sprocket having a sprocket-tooth pitch corresponding to all films, sprockets are ordinarily made to correspond in pitch to the smallest film. It follows that the problem of constant film-speed is not solved by merely employing a sprocket rotating at a substantially constant angular velocity, since, by reason of the discrepancy between the tooth pitch and the sprocket-hole pitch, it is ordinarily necessary that the film shall stop and the sprocket shall move relative to it for a certain fraction of the period during which a frame is advanced. The distortion resulting from this relative motion renders the sound exceedingly objectionable.

To overcome these difficulties, I provide a device described in detail in a copending application of C. R. Hanna and E. H. Greibach, Serial No. 406,847, filed November 13, 1929 and assigned to Westinghouse Electric and Manufacturing Company. A sprocket 42 is resiliently mounted on the shaft 43 of the feed sprocket 17, as will presently be described, to advance the film 18 through the sound gate 29. The yielding connection between the sprocket and the shaft adapts the sprocket teeth to adjust themselves to the sprocket holes and to advance the film at a uniform speed.

However, as the film has a rather small mass per unit length, while the sprocket has a considerable mass, means is provided to increase the effective inertia of the film, and thus to render it unyielding under the action of the spring-actuated sprocket teeth. The continuance for increasing the inertia of the film comprises a film-driven roller 44, rigidly mounted near one end of a shaft 45, on the other end of which a flywheel 46 is centrally located.

Since the torque applied by the film to pull the inertia idler and the frictional force preventing the film from moving relative to the idler both increase with the angle of wrap of the film around the roller, it is desirable that this angle shall be as large as the limitations of the apparatus permit. A preferred arrangement for increasing the angle of wrap is shown in the present embodiment of my invention and comprises a roller 47 properly disposed between the inertia idler 44 and the sound gate 29.

The resilient sprocket 42 feeds the film 18 into a third loop reservoir 48, whence it is delivered to a take-up reel 49 by a hold-back sprocket 51 rigidly fastened to the shaft 43 of the feed sprockets and rotatable therewith. It is to be noted that, as the three sprockets are coaxial, the film must pass under the first feed sprocket, over the second feed sprocket and under the hold-back sprocket. As the first feed sprocket 17 and the hold-back sprocket 51 are interposed between the reels 19 and 49 and the remaining mechanisms and tend to regulate the speed of the film 18 as it is removed from the feeding reel 19 and as it is wound on the take-up reel 49, they are customarily termed insulating sprockets.

In Figs. 10, 11, 12 and 13, an insulating sprocket of one form is shown in detail. It comprises a tooth disc 52 provided with a plurality of holes 53 and a film-supporting roller 54 to which the disc 52 is fastened by screws passing through the holes 53. Since the periphery of the tooth disc 52 adjacent to the teeth cannot be milled smooth, the base diameter of the disc is made smaller than the diameter of film-supporting flanges 55 on the roller 54. A set-screw, that passes through a tapped hole 56 in the sprocket roller 54 and engages the shaft 43, prevents the sprocket from turning relative to the shaft.

A flexibly mounted sprocket is shown in Figs. 18 and 19. A tooth disc 57 is provided with a cylindrical stem 58 that engages the interior surfaces of the hollow cylindrical cavity of a flanged film-supporting roller 59. The stem 58 is so dimensioned that the film-supporting roller is prevented from rotating relative to the tooth disc 57. The tooth disc 57 is capable of rotating freely on the shaft 43, and the film-supporting roller 59 is provided with a hollow cylindrical extension 61 of such diameter that it is constrained to remain permanently coaxial with the shaft 43 but is not prevented from rotating freely relative thereto.

A collar 62 is held in rigid engagement with the shaft 43 by a set screw 63, and a coil spring 64, turned up at both ends, is rigidly fastened, at one end, in a hole 65 in the collar 62 and, at the other end, in a hole 66 in the tooth disc 57.

To render the mechanical system comprising the spring and the sprocket aperiodic, a chamois damping brake 67 is provided between the collar 62 and the base of the film-supporting roller 59.

The film strip 18 is retained in engagement with the sprockets by a plurality of pads 68 eccentrically mounted on a shaft 69. Each pad 68 is rotatable relative to the shaft 69 and is moved into or out of engagement with its corresponding sprocket 17, 42 or 51 by a lever 71 provided with a disc 72 that is rigidly screwed to one base of the stud 68.

Since it is desirable that the pads 68 be held firmly in their closed or open positions, a cavity 73 is provided in each wherein a coil spring 74 is disposed. Each spring urges a plunger 80 latched to the shaft in a plurality of grooves 75 separated by an angle corresponding to the desirable positions of the stud 68.

As the film 18 has a tendency to adhere to the sprocket surface, a stripper 76 is mounted on the upright plate 8 adjacent to the sprockets. The stripper is equipped with a plurality of tongues 77 adapted to engage the sprockets between the film-supporting flanges.

The reels are mounted on a spindle 78 rotatably supported in a bored bracket 79 and driven by a belt 81 that engages a pulley 82 rigidly mounted on one end thereof. The spindle 78 is provided with a slot near its other end wherein a key 83 is slidably held by a pin 84 that, in traversing the shaft 78, engages it in a slot 85. The key 83 is supported on a plurality of springs 86 that yieldingly project it from the slot and enable it to interlock with a key-way provided in the take-up reel 49.

Centrally located on the spindle is a cylindrical bushing 87 having a T-shape longitudinal section. The stem 88 of the bushing is provided with a notched key 89 that engages the feeding reel 19 and causes it to rotate the bushing as it is rotated by the film 18. The notch in the key 89 prevents the reel from becoming disengaged from the bushing 87 by reason of the existing directional irregularities in the torque exerted by the film.

A second cylindrical bushing 91 of longitudinal E section is disposed on the spindle 78 adjacent to the T bushing 87 in such manner that the flange 92 of the latter is located within the cylindrical cavity of the former. A flat spring 93, fastened to the central projection 94 of the E section, resiliently urges the flange 92 into engagement with a washer 95 fastened to the terminal projections 96 of the section. The E-bushing 91 tends to rotate under the frictional action of the T-bushing 87.

A prismatic bracket 97 having a rectangular channel 88 symmetrically located relative to its axes, and a suitable cylindrical channel 99 symmetrically located relative to its base, is fastened to the E-section-bushing 91, at its base. The sides of the rectangular channel 98 engage a plurality of insulated spring strips 101 mounted on an insulated block 102 and carrying a plurality of metallic studs 103. When the bushing 91 is rotated by the reel, in either direction, the studs 103 are brought into contact with each other and, through a plurality of lead wires 104 soldered to the strips 101, complete a circuit through the exciting coils 105 of a relay 106.

The relay circuit is described in detail in a copending application of C. R. Hanna, Serial No. 437,372 filed Mar. 20, 1930, and assigned to the Westinghouse Electric and Manufacturing Company. Suffice it to say here that the relay 106 is so connected to the driving and lighting circuits of the machine that, when the contacts 103 are separated, the machine is stopped, and the lighting current is broken. Obviously then, the machine is automatically stopped when the last layer of film leaves the reel 19. The advantage of this stopping device will be explained presently.

The film-advancing mechanisms are primarily actuated from a motor 107, located on the base plate 9 of the machine 1, as shown in Fig. 5. The power from the motor is transmitted, through a pinion 108 fastened to the motor shaft, to a gear wheel 109 located coaxially with the inertia idler 44.

By reason of the fact that it is obviously undesirable that the power-driven gear wheel 109 shall coact with the film-driven shaft 45 of the inertia idler, a bushing 111 is disposed between the shaft and the gear wheel, and the former rotates within the bushing while the latter rotates externally thereto. The bushing 111 also serves as a support for a ball bearing 112 whereon the inertia roller 46, associated with the idler 44, is mounted.

The gear wheel 109 transmits a portion of its power to the intermittent movement 14, through a second gear wheel 113 meshing therewith. The shutter is centrally located on the intermittent cam shaft. A pinion 114, pressed in a cylindrical extension 115 of the first gear wheel 109 and rotating with it, transmits the necessary power to the sprocket shaft 43 through a third gear wheel 116. The pulley 117, through which the reel spindle 78 is driven, is cut integral with the first gear wheel 109.

In Figs. 22 and 23, the means that I have provided for facilitating the threading process are illustrated.

The two ends of a film roll are respectively equipped with a tongue 118 and a slot 119 that are adapted to interlock with each other or either of them with the suitably cut end of another film.

When the last layer of film has left the feeding reel, the machine is stopped, as has been described hereinabove, and the leader of the new roll is attached to the end of the roll that has been exhibited.

As the film-strip disposed between the reel and the first insulating sprocket 17 is rather short, the machine must be prevented from coasting too long after the relay contact is broken. For this reason, I provide a brake 121 on the relay contact arm 122 that is brought into engagement with the gear wheel 109, driven by the motor pinion 108, by the spring 123 that urges the contact 124 to open position.

I may further point out that the machine need be threaded by hand comparatively rarely, as I provide a web of celluloid or other suitable material having an engaging tongue 118 and a slot 119 in its respective ends, which may be positioned in the machine by the end of the last roll that is exhibited. The machine is thus prepared for a future exhibition.

A similar web may also be removably attached to the end of each roll of film supplied by the film library. The web thus attached is positioned in the machine after the roll to which it is affixed is projected. The roll may, in turn, be detached from the web and removed from the machine when it is halted by the action of the automatic stopping device. The machine is thus at once prepared for the projection of a new reel.

Finally, I may point out that a punch may be provided wherewith the owner of a machine may produce his own film leaders.

As shown in Fig. 6, the leads carrying electrical current to the motor and the lamps are located in the bottom of the machine and are ordinarily enclosed by a cover 125. Certain of the leads 126 are soldered to the starting switch 127 at the necessary terminal points 128, and the remainder traverse a plurality of openings 129 in the base to make contact with the motor, the motor resistor, the relay and the lamps, as described in the last mentioned copending application. The wires 131 leading to the power supply pass through an opening 132 in the side of the base 9 of the machine.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. In film-handling apparatus, a plurality of film-advancing rollers disposed on one shaft, at least one of said rollers being resiliently mounted on said shaft.

2. In film-handling apparatus, a plurality of film-advancing rollers mounted on one shaft, and a film-driven roller, at least one of said film-advancing rollers being resiliently mounted on said shaft and said film-driven roller having considerable inertia.

3. In film-handling apparatus, a supporting plate, bearing means mounted on said plate, a shaft having a roller to be driven only by the frictional coaction therewith of a film strip, disposed on one end thereof an inertia member disposed on the other end thereof, rotatably supported within said bearing means, and a power-driven dentate means having dentate driving means and friction driving means supported thereon rotatably mounted on said bearing means.

4. In film-handling apparatus, a prime mover, rotatable means coacting with said prime mover to operate a plurality of film-advancing mechanisms, and a roller coaxially located relative to said means to coact with a film-strip to be driven thereby.

5. In film-handling apparatus, film driving means, automatic means for halting the operation of said film-driving means, and means actuated by said automatic means and coacting with said film-driving means to dissipate the kinetic energy thereof.

6. Driving apparatus comprising a prime mover, a plurality of gripping mechanisms operated thereby and a relay controlling the supply of power from said prime mover, in combination with means actuated by said relay and coacting with said gripping mechanisms to dissipate the energy thereof when the power supply has been removed therefrom.

7. In film-handling apparatus, means driven by the film for increasing the effective inertia of a film-strip and means, including a member coaxially disposed with said inertia-increasing means and substantially mechanically independent thereof for driving said film-strip.

8. In film handling apparatus means for storing a film-strip, means including a power driven mechanism to engage the film-strip for advancing said film-strip from said storing means through said apparatus, an inertial roller in the path of the film-strip to be rotated only by the friction of the film-strip when said film-strip is so advanced, a take-up reel for storing said film-strip after it has been advanced by said mechanism and driving means for said take-up reel, including an element mounted co-axial with said inertial roller and operatively connected to said mechanism.

ELLWOOD W. REYNOLDS.